United States Patent
Matsuki

(10) Patent No.: US 7,535,661 B2
(45) Date of Patent: May 19, 2009

(54) INERTIAL DRIVE ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 115 days.

(21) Appl. No.: 11/786,022

(22) Filed: Apr. 10, 2007

(65) Prior Publication Data

US 2007/0241640 A1    Oct. 18, 2007

(30) Foreign Application Priority Data

Apr. 12, 2006    (JP) .............................. 2006-109834

(51) Int. Cl.
*G02B 7/02*    (2006.01)

(52) U.S. Cl. ........................ 359/811; 359/813; 359/814; 359/819

(58) Field of Classification Search ................. 359/811, 359/813, 814, 817, 819, 821, 822, 823, 824
See application file for complete search history.

(56) References Cited

U.S. PATENT DOCUMENTS 5,225,941 A    7/1993    Saito et al.

| | | |
|---|---|---|
| 6,841,899 B2 | 1/2005 | Kaneko |
| 2007/0096602 A1* | 5/2007 | Matsuki ...................... 310/338 |

FOREIGN PATENT DOCUMENTS

| | | |
|---|---|---|
| DE | 199 50 271 A1 | 2/2001 |
| EP | 0 675 589 A1 | 10/1995 |
| WO | WO 96/02950 | 2/1996 |

* cited by examiner

*Primary Examiner*—Timothy J Thompson
(74) *Attorney, Agent, or Firm*—Scully, Scott, Murphy & Presser, P.C.

(57) ABSTRACT

An inertial drive actuator includes a vibrating substrate configured to be reciprocally moved by small reciprocally displacements generated by a displacement generating unit arranged on a fixing member. The vibrating substrate has a first electrode on a plane of the vibrating substrate and an insulating layer on the first electrode. The inertial drive actuator further includes a mobile object arranged on the plane of the vibrating substrate and having a second electrode on a plane facing the first electrode through the insulating layer, a frictional force control unit configured to control frictional force between the vibrating substrate and the mobile object such that a potential difference is applied across the first electrode and the second electrode to cause electrostatic adsorptive force to act, and a frictional force applying unit configured to frictionally couple the mobile object and the vibrating substrate to each other by magnetic adsorptive force.

21 Claims, 4 Drawing Sheets

INERTIAL DRIVE ACTUATOR

CROSS-REFERENCE TO RELATED APPLICATIONS

This application is based upon and claims the benefit of priority from prior Japanese Patent Application No. 2006-109834, filed Apr. 12, 2006, the entire contents of which are incorporated herein by reference.

BACKGROUND OF THE INVENTION

1. Field of the Invention

The present invention relates to an inertial drive actuator which stepping-drives a mobile object.

2. Description of the Related Art

There is known an inertial drive actuator which supplies a saw-toothed drive pulse to an electromechanical conversion element coupled to a drive shaft to displace the drive shaft in an axial direction and to move a mobile object frictionally coupled to the drive shaft in the axial direction.

This inertial drive actuator is disclosed in, for example, U.S. Pat. No. 5,225,941. As shown in FIG. 1 in the U.S. Patent, a driving rod serving as a vibrating member is inserted into a hole formed in an upright portion of a supporting member and movably arranged in an axial direction of the vibrating member. One end of the vibrating member is fixed to one end of a piezoelectric element. The other end of the piezoelectric element is fixed to the supporting member. Therefore, with vibration of the piezoelectric element, the vibrating member vibrates in the axial direction. A lens barrel serving as a mobile object has two holes formed therein, and the vibrating member is inserted into the holes. Furthermore, a leaf spring is fitted on the mobile object from beneath, and a curved projection which is a projecting portion formed on the leaf spring is brought into press contact with the vibrating member. In this manner, the mobile object and the vibrating member are frictionally coupled to each other by being pressed by the leaf spring.

In the inertial drive actuator, as shown in FIG. 3(A) in the U.S. Patent, a drive voltage waveform has a sharply upright portion and a moderately fall portion. In the sharply upright portion, the piezoelectric element sharply extends to rapidly move the mobile object fixed to the piezoelectric element. However, the mobile object overcomes frictional coupling force between the mobile object and the vibrating member by the inertia to stay at the position without moving. When the piezoelectric element moderately shrinks, the vibrating member fixed to the piezoelectric element slowly moves. In this case, with frictional force between the mobile member brought into press contact with the leaf spring and the vibrating member, the mobile object moves along with movement of the vibrating member.

As described above, the inertial drive actuator is an actuator which can move the mobile object by the frictional coupling between the mobile object and the vibrating member generated by the leaf spring and application of a voltage having the drive voltage waveform.

When the leaf spring always brings the vibrating member into press contact with the mobile object to frictionally support the mobile member to keep the position thereof when the mobile object is stopped.

BRIEF SUMMARY OF THE INVENTION

According to an aspect of the present invention, there is provided an inertial drive actuator comprising:

a fixing member;

a displacement generating unit arranged on the fixing member and configured to generate small displacements in a first direction and a second direction opposing the first direction;

a vibrating substrate configured to be reciprocally moved by the small displacements of the displacement generating unit and having a first electrode on a plane of the vibrating substrate and an insulating layer on the first electrode;

a mobile object arranged on the plane of the vibrating substrate and having a second electrode on a plane facing the first electrode through the insulating layer;

a frictional force control unit configured to control frictional force between the vibrating substrate and the mobile object such that a potential difference is applied across the first electrode and the second electrode to cause electrostatic adsorptive force to act; and a frictional force applying unit configured to frictionally couple the mobile object and the vibrating substrate to each other by magnetic adsorptive force.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A best mode for carrying out the present invention will be described below with reference to the accompanying drawings.

First Embodiment

Figure 1A:
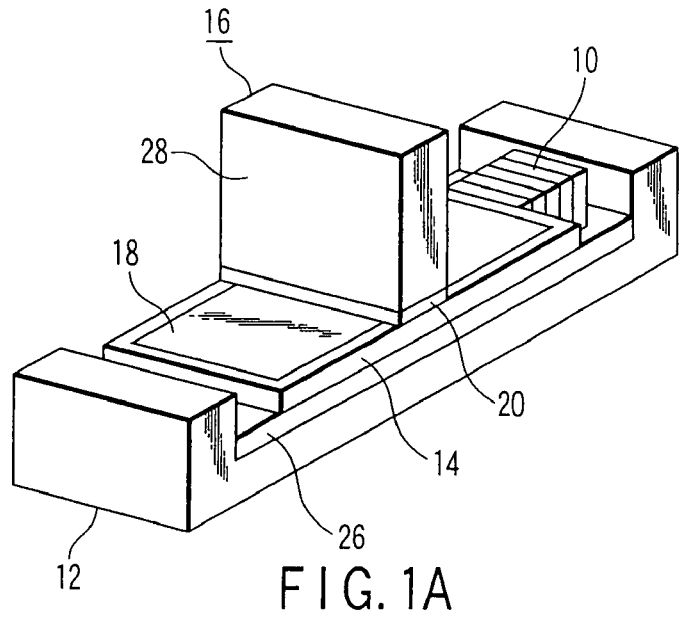
FIG. 1A is a perspective view showing a configuration of an inertial drive actuator according to a first embodiment of the present invention.
Figure 1B:
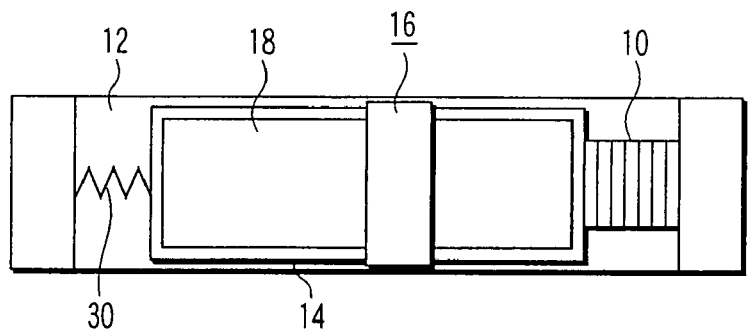
FIG. 1B is a plan view showing the configuration of the inertial drive actuator according to the first embodiment.
Figure 1C:
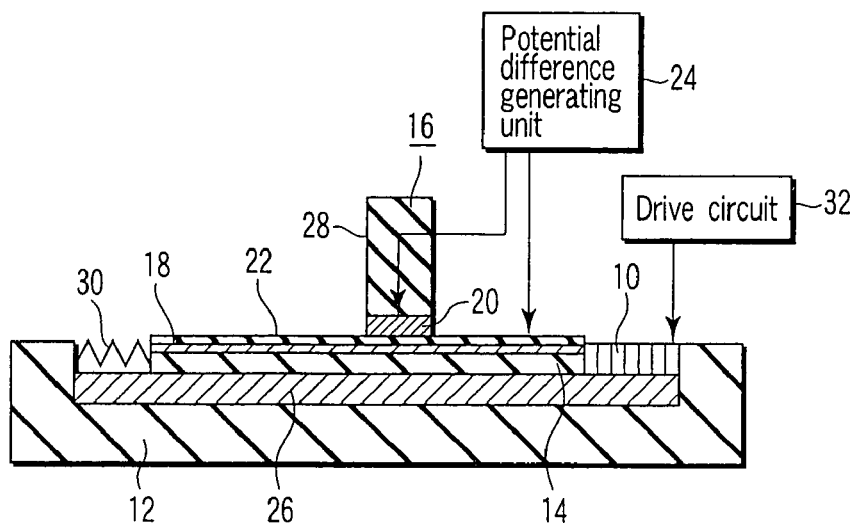
FIG. 1C is a sectional view showing the configuration of the inertial drive actuator according to the first embodiment.

In an inertial drive actuator according to a first embodiment of the present invention, as shown in FIGS. 1A to 1C, one end of a piezoelectric element 10 is fixed to a fixing member 12, and the other end of the piezoelectric element 10 is fixed to one end of a vibrating substrate 14. A mobile object 16 which can move in a vibration direction of the piezoelectric element 10 is arranged on the vibrating substrate 14. A first electrode 18 is formed on a plane of the vibrating substrate 14 facing the mobile object 16, and a second electrode 20 is formed on a plane of the mobile object 16 facing the vibrating substrate 14. The first electrode 18 and the second electrode 20 are in contact with each other through an insulating film 22 formed on the first electrode 18 to face each other. When a potential generating unit 24 applies a potential difference across the first electrode 18 and the second electrode 20, electrostatic adsorptive force acts between the electrodes 18 and 20.

On the side of the vibrating substrate 14 opposing the side on which the mobile object 16 is arranged, a permanent magnet 26 is arranged to extend in the vibration direction of the vibrating substrate 14. On the mobile object 16, an adsorbed member 28 having magnetism is arranged. For this reason, magnetic adsorptive force acts between the permanent magnet 26 and the mobile object 16. The permanent magnet 26 and the adsorbed member 28 are arranged to make it possible to stop the mobile object 16. Furthermore, even though electrostatic adsorptive force does not act between the first electrode 18 and the second electrode 20, the mobile object 16 can be held at the position due to frictional force even in a stopped state. Since the permanent magnet 26 is not in contact with the adsorbed member 28, frictional force can be supplied without being influenced by abrasion or the like. For this reason, the actuator can be stably driven.

The other end of the vibrating substrate 14 is biased toward the piezoelectric element 10 by a bias spring 30. A drive voltage to displace the piezoelectric element 10 is applied from a drive circuit 32 to the piezoelectric element 10.

A guide may be arranged not to move the mobile object 16 in a direction other than the vibration direction of the piezoelectric element 10.

An operation of the inertial drive actuator having the above configuration will be described below.

Figure 2A:
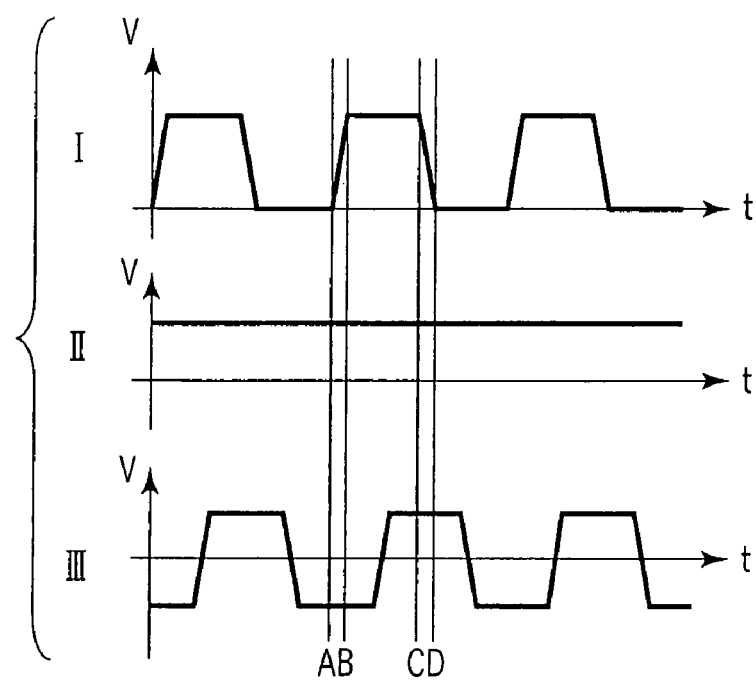
FIG. 2A is a waveform chart showing waveforms of applied voltages to respective parts of the inertial drive actuator according to the first embodiment when a mobile object is moved to the left in FIG. 1C.

A driving principle will be described first with reference to FIG. 2A. In FIG. 2A, an applied voltage waveform I denotes an applied voltage from the drive circuit 32 to the piezoelectric element 10, an applied voltage waveform II denotes an applied voltage from a potential difference generating unit 24 to the first electrode 18, and an applied voltage waveform III denotes an applied voltage from the potential difference generating unit 24 to the second electrode 20.

In a period from time point A to time point B shown in FIG. 2A, an applied voltage from the drive circuit 32 to the piezoelectric element 10 is sharply upright, and the piezoelectric element 10 is sharply displaced to the left in FIG. 1C. Accordingly, the vibrating substrate 14 also sharply moves to the left. At this time, simultaneously, by the potential difference generating unit 24, an applied voltage to the first electrode 18 arranged on the vibrating substrate 14 and an applied voltage to the second electrode 20 arranged on the mobile object 16 have a potential difference. For this reason, electrostatic adsorptive force acts between the vibrating substrate 14 and the mobile object 16 to increase frictional force. Therefore, with the displacement of the vibrating substrate 14, the mobile object 16 moves to the left.

In a period from time point C to time point D in FIG. 2A, in contrast to the above, an applied voltage to the piezoelectric element 10 sharply falls. When the piezoelectric element 10 sharply shrinks, the vibrating substrate 14 sharply moves to the right in FIG. 1C. At this time, since an applied voltage to the first electrode 18 of the vibrating substrate 14 and an applied voltage to the second electrode 20 of the mobile object 16 are equal voltages, electrostatic adsorptive force is not generated between the electrodes 18 and 20. Therefore, due to inertia of the mobile object 16, the mobile object 16 overcomes frictional force between the vibrating substrate 14 and the mobile object 16 generated by magnetic adsorptive force between the permanent magnet 26 and the mobile object 16 on which the adsorbed member 28 is installed, to stay at the position.

By repeating this operation, the mobile object 16 moves to the left with respect to the vibrating substrate 14.

Figure 2B:
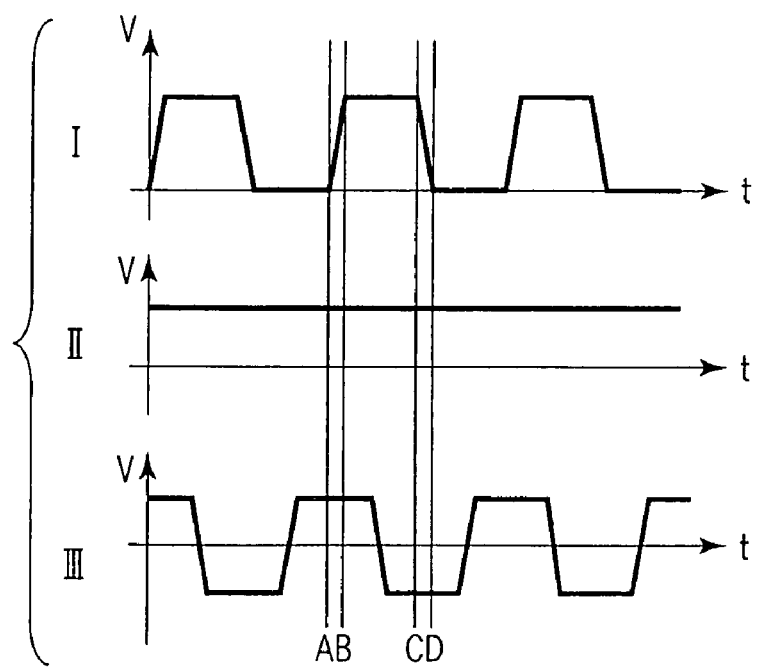
FIG. 2B is a waveform chart showing waveforms of applied voltages to the respective parts of the inertial drive actuator according to the first embodiment when the mobile object is moved to the right in FIG. 1C.

When the mobile object 16 is moved to the right in FIG. 1C, as shown in FIG. 2B, a potential difference may be applied across the first and second electrodes 18 and 20 when the piezoelectric element 10 is sharply shrunk.

The above is a basic drive principle of the inertial drive actuator according to the embodiment. Since friction is given in synchronism with piezoelectric vibration, the mobile object 16 moves only when the friction increases, and thus the drive efficiency is improved. At the same time, the actuator can be inertially driven without reciprocally changing a displacement rate of the piezoelectric element 10. As a result, driving waveforms can be simplified.

When the moving mobile object 16 is stopped, if driving of the piezoelectric element 10 and supply of the potential difference across the first and second electrodes 18 and 20 are stopped, the frictional force between the vibrating substrate 14 and the mobile object 16 by the magnetic adsorptive force between the permanent magnet 26 and the adsorbed member 28 can stop the mobile object 16 and hold the mobile object 16 at the position.

As described above, in the first embodiment, the frictional force applying unit which frictionally couples the mobile object 16 and the vibrating substrate 14 to each other by the magnetic adsorptive force is arranged to always constantly apply frictional force and to make it possible to stably drive the actuator.

In the embodiment, although the permanent magnet 26 is arranged under the vibrating substrate 14, the vibrating substrate 14 itself may be constituted by a permanent magnet. When the vibrating substrate 14 is a permanent magnet, parts constituting the inertial drive actuator can be reduced in number, and a simple configuration can be achieved.

When a material having magnetism is used as the mobile object 16, even though the adsorbed member 28 is not additionally arranged, not only an effect equivalent to that of the embodiment but also a simpler configuration can be obtained.

In this case, as a magnetic material used in the mobile object 16, iron, a nickel alloy, stainless steel, or the like is typically used.

Dimensions of the inertial drive actuator are typically 20 mm in length×3 mm in width×3 mm in height.

Figure 3:
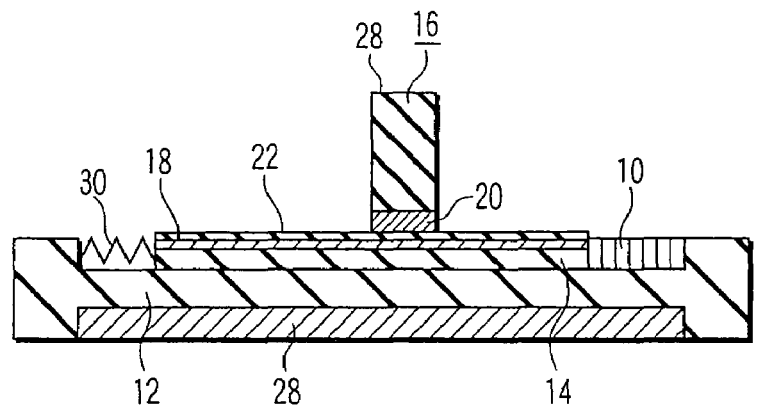
FIG. 3 is a sectional view showing a configuration of a modification of the inertial drive actuator according to the first embodiment.

As shown in FIG. 3, the position of the permanent magnet 26 may be arranged under the fixing member 12. In order to simplify the drawing, the potential difference generating unit 24 and the drive circuit 32 are omitted in FIG. 3 (as in FIGS. 4 to 6 described later).

In this manner, the permanent magnet 26 is arranged under the fixing member 12 to prevent the vibrating substrate 14 and the permanent magnet 26 from being in contact with each other. For this reason, abrasion of the permanent magnet 26 caused by vibration generated by the vibrating substrate 14 is eliminated. Furthermore, in this case, when the fixing member 12 consists of the magnetic material, the permanent magnet 26 can be fixed to the fixing member 12 by magnetic adsorptive force, and adhesive bonding or the like is not required. For this reason, the inertial drive actuator can be easily assembled.

Second Embodiment

Figure 4:
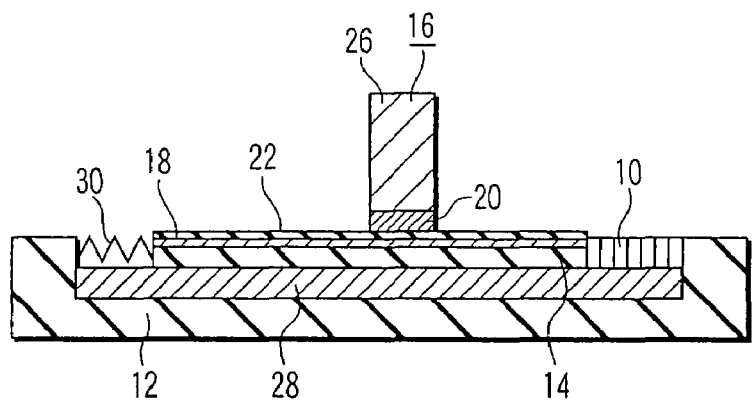
FIG. 4 is a sectional view showing a configuration of an inertial drive actuator according to a second embodiment of the present invention.

In an inertial drive actuator according to a second embodiment of the present invention, unlike in the first embodiment, the permanent magnet 26 is not arranged on the fixing member 12 side, and the permanent magnet 26 is arranged on the mobile object 16 side as shown in FIG. 4.

In this manner, the permanent magnet 26 is arranged on the mobile object 16 side to make it possible to stably generate magnetic adsorptive force regardless of the position of the mobile object 16.

Figure 5:
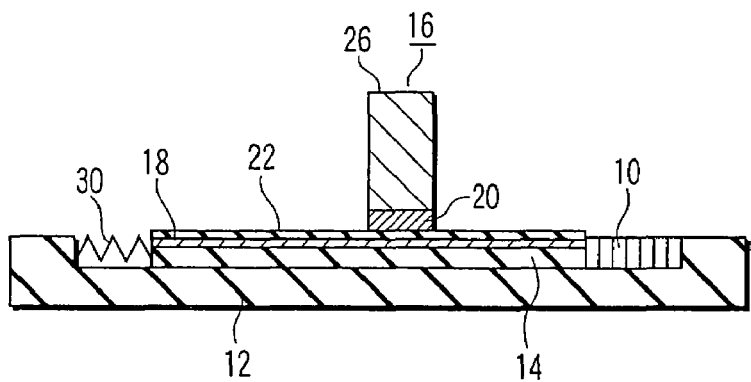
FIG. 5 is a sectional view showing a configuration of a modification of the inertial drive actuator according to the second embodiment.

As shown in FIG. 5, the fixing member 12 may consist of a magnetic material.

When the fixing member 12 consists of the magnetic material as described above, a simpler configuration is obtained because an adsorbed member 28 is not necessary. In this case, as the magnetic material used in the fixing member 12, iron, a nickel alloy, stainless steel, or the like is used. However, the magnetic material is not limited to these materials, and any material having magnetism may be used.

Third Embodiment

Figure 6:
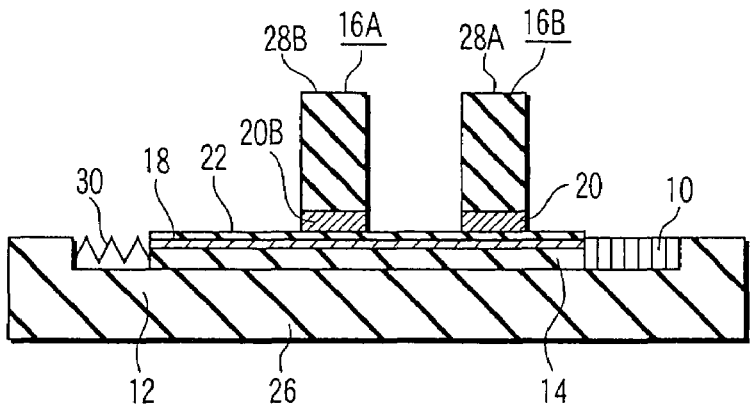
FIG. 6 is a sectional view showing a configuration of an inertial drive actuator according to a third embodiment of the present invention.

In an inertial drive actuator according to a third embodiment of the present invention, as shown in FIG. 6, a first mobile object 16A and a second mobile object 16B are arranged on a vibrating substrate 14. In this case, each of the mobile objects 16A and 16B has the same configuration as that of the mobile object 16 in the first embodiment. More specifically, in the first mobile object 16A, a second electrode 20A is formed through an insulating film 22 to face a first electrode 18 of the vibrating substrate 14, and an adsorbed member 28A having magnetism is also arranged. Similarly, in the second mobile object 16B, a second electrode 20B is formed through the insulating film 22 to face the first electrode 18 of the vibrating substrate 14, and an adsorbed member 28B having magnetism is arranged. The other configurations are the same as those in the modification of the first embodiment.

An operation of the inertial drive actuator according to the embodiment will be described below with reference to FIGS. 7A and 7B. In these drawings, an applied voltage waveform I denotes an applied voltage from a drive circuit 32 to a piezoelectric element 10, an applied voltage waveform II denotes an applied voltage from a potential difference generating unit 24 to the first electrode 18, an applied voltage waveform III denotes an applied voltage from the potential difference generating unit 24 to the second electrode 20A of the first mobile object 16A, and an applied voltage waveform IV denotes an applied voltage from the potential difference generating unit 24 to the second electrode 20B of the second mobile object 16B.

Figure 7A:
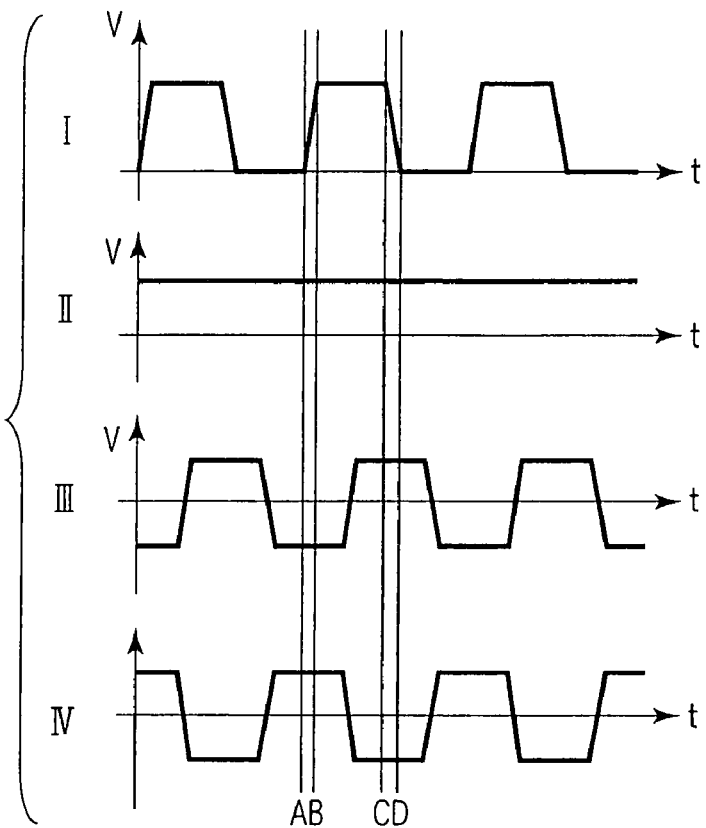
FIG. 7A is a waveform chart showing waveforms of applied voltages to respective parts of the inertial drive actuator according to the third embodiment when a first mobile object is moved to the left in FIG. 6 and a second mobile object is moved to the right in FIG. 6 independently of each other.

In a period from time point A to time point B shown in FIG. 7A, the applied voltage waveform from the drive circuit 32 to the piezoelectric element 10 is sharply upright, and the vibrating substrate 14 also rapidly moves to the left in accordance with rapid displacement of the piezoelectric element 10 to the left in FIG. 6. At this time, simultaneously, by the potential difference generating unit 24, an applied voltage to the first electrode 18 arranged on the vibrating substrate 14 and an applied voltage to the second electrode 20A arranged on the first mobile object 16A have a potential difference. For this reason, electrostatic adsorptive force acts between the vibrating substrate 14 and the first mobile object 16A to increase frictional force. Therefore, with the displacement of the vibrating substrate 14, the first mobile object 16A moves to the left. On the other hand, with respect to the second mobile object 16B, since the applied voltage to the first electrode 18 of the vibrating substrate 14 and the applied voltage to the second electrode 20B of the second mobile object 16B are equal voltages, electrostatic adsorptive force is not generated between the electrodes. Therefore, since the inertial force of the second mobile object 16B overcomes frictional force between the vibrating substrate 14 and the second mobile object 16B, the second mobile object 16B stays at the position.

In a period from time point C to time point D in FIG. 7A, in contrast to the above, an applied voltage waveform to the piezoelectric element 10 sharply falls. When the piezoelectric element 10 sharply shrinks, the vibrating substrate 14 sharply moves to the right in FIG. 6. At this time, since an applied voltage to the first electrode 18 of the vibrating substrate 14 and an applied voltage to the second electrode 20A of the first mobile object 16A are equal voltages, electrostatic adsorptive force is not generated between the electrodes. Therefore, since the inertial force of the first mobile object 16A overcomes frictional force between the vibrating substrate 14 and the first mobile object 16A, the first mobile object 16A stays at the position. In contrast to this, with respect to the second mobile object 16B, since the applied voltage to the first electrode 18 arranged on the vibrating substrate 14 and the applied voltage to the second electrode 20B arranged on the second mobile object 16B have a potential difference, electrostatic adsorptive force acts between the vibrating substrate 14 and the second mobile object 16B to increase frictional force. Therefore, with displacement of the vibrating substrate 14, the second mobile object 16B moves to the right.

By repeating this operation, the first mobile object 16A moves to the left with respect to the vibrating substrate 14, and the second mobile object 16B moves to the right with respect to the vibrating substrate 14.

In this manner, a waveform obtained by inverting the waveform applied to the first mobile object 16A is applied to the second mobile object 16B to make it possible to independently move the first mobile object 16A to the left and the second mobile object 16B to the right.

Figure 7B:
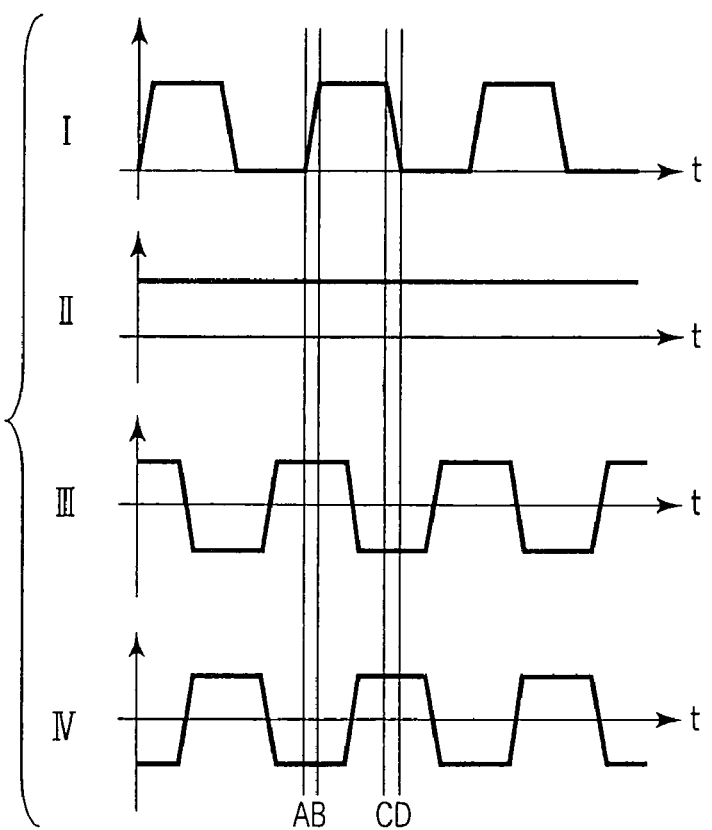
FIG. 7B is a waveform chart showing waveforms of applied voltages to the respective parts of the inertial drive actuator according to the third embodiment when the first mobile object is moved to the right in FIG. 6 and the second mobile object is moved to the left in FIG. 6 independently of each other.

When the second mobile object 16B is moved to the left simultaneously with the movement of the first mobile object 16A to the right, as shown in FIG. 7B, a potential difference may be applied across the first electrode 18 and the second electrode 20A when the piezoelectric element 10 is sharply shrunk, and a potential difference may be applied across the first electrode 18 and the second electrode 20B when the piezoelectric element 10 is sharply extended.

As a matter of course, when waveforms having equal phases are applied to the first mobile object 16A and the second mobile object 16B, respectively, the two mobile objects 16A and 16B move in the same direction. The waveform is applied only to a mobile object to be moved to make it possible to move only one mobile object as a matter of course.

In this manner, two or more mobile objects can be independently moved without changing the size of the inertial drive actuator.

As in this embodiment, the above modifications described in the first embodiment can be achieved as a matter of course.

As in the second embodiment, the permanent magnet 26 may be arranged on a mobile object side.

The present invention has been described with reference to the embodiments. However, the present invention is not limited to the embodiments, and various changes and applications can be effected without departing from the spirit and scope of the invention as a matter of course.

For example, the piezoelectric element 10 is used as a displacement generating unit. However, the displacement generating unit is not limited to the piezoelectric element 10. An electrostatic actuator, an electromagnetic actuator, an electrostrictive actuator, and the like may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inertial drive actuator comprising:
    a fixing member;
    a displacement generating unit arranged on the fixing member and configured to generate small displacements in a first direction and a second direction opposing the first direction;
    a vibrating substrate configured to be reciprocally moved by the small displacements of the displacement generating unit and having a first electrode on a plane of the vibrating substrate and an insulating layer on the first electrode;
    a mobile object arranged on the plane of the vibrating substrate and having a second electrode on a plane facing the first electrode through the insulating layer;
    a frictional force control unit configured to control frictional force between the vibrating substrate and the mobile object such that a potential difference is applied across the first electrode and the second electrode to cause electrostatic adsorptive force to act; and
    a frictional force applying unit configured to frictionally couple the mobile object and the vibrating substrate to each other by magnetic adsorptive force.

2. The actuator according to claim 1, wherein
the frictional force control unit controls the electrostatic adsorptive force to make frictional forces between the mobile object and the vibrating substrate different in outward and homeward routes of the displacement generating unit.

3. The actuator according to claim 2, wherein
a fine displacement speed of the displacement generating unit in the first direction is equal to a fine displacement speed in the second direction opposing the first direction.

4. The actuator according to claim 1, wherein
the frictional force applying unit includes:
an adsorbed member arranged on the mobile object and having magnetism; and
a magnetic field generating unit arranged to face the mobile object through the vibrating substrate and configured to generate a magnetic field.

5. The actuator according to claim 4, wherein
the magnetic field generating unit is arranged through the fixing member.

6. The actuator according to claim 4, wherein
the fixing member consists of a material having magnetism.

7. The actuator according to claim 4, wherein
the vibrating substrate has the magnetic field generating unit.

8. The actuator according to claim 1, wherein
the mobile object consists of a material having magnetism, and
the frictional force applying unit includes a magnetic field generating unit arranged to face the mobile object through the vibrating substrate and configured to generate a magnetic field.

9. The actuator according to claim 1, wherein
the frictional force applying unit includes:
a magnetic field generating unit arranged on the mobile object and configured to generate a magnetic field; and
an adsorbed member arranged on the fixing member to face the mobile object through the vibrating substrate and having magnetism.

10. The actuator according to claim 1, wherein
the fixing member consists of a material having magnetism, and
the frictional force applying unit includes a magnetic field generating unit arranged on the mobile object and configured to generate a magnetic field.

11. The actuator according to claim 3, wherein
a plurality of mobile objects on each of which the second electrode is arranged are present, and electrostatic forces between the vibrating substrate and the mobile objects are independently changed in units of mobile objects.

12. The actuator according to claim 11, wherein
the frictional force applying unit includes:
adsorbed members each arranged on each of the mobile objects and having magnetism; and
a magnetic field generating unit arranged to face the mobile objects through the vibrating substrate and configured to generate a magnetic field.

13. The actuator according to claim 12, wherein
the magnetic field generating unit is arranged through the fixing member.

14. The actuator according to claim 12, wherein
the fixing member consists of a material having magnetism.

15. The actuator according to claim 12, wherein
the vibrating substrate has the magnetic field generating unit.

16. The actuator according to claim 11, wherein
the mobile objects consist of a material having magnetism, and
the frictional force applying unit includes a magnetic field generating unit arranged to face the mobile objects through the vibrating substrate and configured to generate a magnetic field.

17. The actuator according to claim 11, wherein the frictional force applying unit includes:
magnetic field generating units each arranged on each of the mobile objects and configured to generate a magnetic field; and
an adsorbed member arranged on the fixing member to face the mobile objects through the vibrating substrate and having magnetism.

18. The actuator according to claim 11, wherein the fixing member consists of a material having magnetism, and
the frictional force applying unit includes magnetic field generating units each arranged on each of the mobile objects and configured to generate a magnetic field.

19. The actuator according to claim 3, wherein the frictional force applying unit includes:
an adsorbed member arranged on the mobile object and having magnetism; and
a magnetic field generating unit arranged to face the mobile object through the vibrating substrate and configured to generate a magnetic field.

20. The actuator according to claim 19, wherein the magnetic field generating unit is arranged through the fixing member.

21. The actuator according to claim 3, wherein the mobile object consists of a material having magnetism, and
the frictional force applying unit includes a magnetic field generating unit arranged to face the mobile object through the vibrating substrate and configured to generate a magnetic field.

* * * * *